United States Patent Office 3,235,557
Patented Feb. 15, 1966

3,235,557
NEW OXAZOLINE DERIVATIVES
Leslie Frederick Wiggins, Wargrave, and John William James, Langley, England, and Colin Beard, Mexico City, Mexico, assignors to Aspro-Nicholas Limited, a British company
No Drawing. Filed Dec. 24, 1963, Ser. No. 333,177
Claims priority, application Great Britain, Oct. 2, 1959, 33,489/59
5 Claims. (Cl. 260—307)

This application is a continuation-in-part of our co-pending patent application Serial No. 57,912, filed September 23, 1960, and now abandoned.

This invention relates to new oxazoline derivatives and their use in methods of treatment.

It is an object of the invention to provide novel oxazoline derivatives having useful biological activity. It is also an object of the invention to provide a method of treatment of animals involving the administration to them of effective doses of biologically active oxazoline derivatives not hitherto suggested for that purpose. Another object of the invention is to provide a method of tranquilising animals. A yet further object is to provide a method of anticonvulsant treatment for animals.

This invention provides new oxazoline derivatives which have the formula:

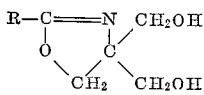

(I)

wherein R is a halogenophenyl, o-hydroxyphenyl or m-trifluoromethyl group, including nontoxic pharmacologically acceptable salts of oxazoline compounds having Formula I.

A particularly important group of oxazoline compounds according to the invention is that in which R represents a phenyl group substituted by at least one halogen atom, for example by one or two or more halogen atoms, which may be the same or different, for example chlorine, bromine or fluorine. Advantageously, the halogen substituent, or at least one of the halogen substituents if there is more than one, is in the position meta to the point of attachment of the phenyl group to the oxazoline nucleus. An important subgroup of the compounds according to the invention is that in which there are at least two halogen substituents on the phenyl ring, two of which are in positions meta to its point of attachment to the oxazoline nucleus. It will be understood that the phenyl ring may also bear one or more additional substituents.

The oxazoline derivatives of Formula I may be prepared by a method which comprises heating an appropriate acid (RCOOH) or an ester of the appropriate acid (R.COOR', where R' is preferably a lower alkyl group having from 1 to 4 carbon atoms, e.g. methyl, or an aryl group, e.g. phenyl) with trishydroxymethylaminomethane ("trisamine") to produce the desired oxazoline derivative. In the case where the acid itself is used, the two reactants may be heated in an inert organic solvent, the water formed during the reaction being removed by azeotropic distillation. In the case where the ester is used, the two reactants may be heated either in vacuo in the absence of a solvent, or in the presence of an inert organic solvent which is slowly distilled off, said solvent carrying with it the water and alcohol formed during the reaction. Examples of inert organic solvents which give a suitable rate of reaction are benzene, toluene, xylene, p-cymene and tetralin.

The nontoxic salts of the oxazoline derivatives of Formula I above may be prepared by reacting such an oxazoline derivative with a desired nontoxic pharmacologically acceptable acid, for example hydrochloric acid.

The compounds of this invention have been found to be active central nervous system (C.N.S.) depressants in animals, more particularly by means of the so-called audiogenic seizure test in rats and/or the so-called anti-metrazole or metrazole-interaction test in mice.

In the audiogenic seizure test, one employs a susceptible strain of rat in which the sounding of a buzzer produces a characteristic seizure. This seizure can be prevented by pretreating the rats with oral doses of C.N.S. depressants such as those employed in man as tranquilisers, anticonvulsants or sedatives. Having initially determined that the rats to be employed are susceptible in that they respond to audiogenic stimulus by convulsing, the rats are in a first step dosed orally with the highest nontoxic level of the compound under test and then again submitted to the stimulus. In the case of active compounds, no convulsive seizures take place. Compounds shown to be active are then tested again in the same way but at progressively reduced dose levels until seizures are again noted, indicating that the lowest active dose level has been passed.

The metrazole-interaction test or, to give it its fuller name, the pentamethylene-tetrazole shock test, is described by Goodman, Grewal, Brown and Swinyard in a paper entitled "Comparison of Maximal Seizures Evoked by Pentylene-tetrazol (Metrazol) and Electroshock in Mice, and Their Modification by Anticonvulstants" in The Journal of Pharmacology and Experimental Therapeutics, vol. 108, page 168, 1953. In this test metrazole solution is infused into the tail vein of the mouse up to a dosage at which convulsions occur, all mice used by us being found to react in this way. The amount of metrazole necessary to effect this is calculated in a control group of animals. In two other groups of animals two dose levels of the test compound are administered by intraperitoneal injection. Activity in protecting against convulsions is shown by the increase in the amount of metrazole that it is found necessary to infuse before convulsions are produced. The corresponding increase in the amount of metrazole required when a standard drug, tridione, is employed is also determined and the activity of the test compounds is expressed in terms of this standard drug.

The following table sets out the results of testing a representative selection of the oxazoline compounds of the invention by the audiogenic seizure and/or metrazole interaction tests:

TABLE

| R in Formula I represents | Audiogenic seizure test (mg./kg. orally) | Metrazole interaction test (Tridione=1) |
|---|---|---|
| 2'-hydroxyphenyl | Active at 100 | 1 |
| 2'-chlorophenyl | Active at 150 | 1 |
| 3'-chlorophenyl | Active at 40 | 3 |
| 4'-chlorophenyl | Active at 60 | 1 |
| 3'-bromophenyl | Active at 32 | 5 |
| 3'-fluorophenyl | (Not tested) | 2 |
| 3':5'-dibromophenyl | Active at 32 | 1.3 |
| 3':5'-dichlorophenyl | (Not tested) | 4 |
| 3':5'-dibromo-2'-hydroxyphenyl | ___do___ | 2 |
| 3'-trifluoromethylphenyl | ___do___ | 3 |

During the early stages of the work here reported, the audiogenic seizure test was employed. This test, however, relies upon the availability of a susceptible strain of rat. Latterly, therefore, only the more convenient metrazole interaction test has been employed, it having been found that when both tests were applied to a given test compound a reasonable equivalence between the two tests was shown. Both tests are based on subjecting the test animal to a stress to which it reacts by convulsing and in both tests pre-treatment of the animal with an active compound gives protection against the convulsive reaction by producing specific depression of certain centres in the central nervous system. That is to say the animals are protected against stress or tranquilised much as the effects of stress in man are prevented or ameliorated by the administration of tranquilisers. Each of these tests is therefore a good test for indicating compounds active as anticonvulsants and tranquilisers in animals.

The invention thus also provides a method of tranquilising an animal comprising administering to it an effective dose of an oxazoline compound provided by the invention. The invention further includes a method of anticonvulsant treatment comprising administering to an animal an effective dose of an oxazoline compound provided by the invention. What will be an effective tranquilising or anticonvulsant dose in any particular case will depend inter alia on the size of the animal. The requisite dosage may, however, readily be ascertained by trial.

A correlation has been shown between the activity of known drugs as shown in the tests described above and their tranquilising activity in man and it has also been shown that known drugs currently used in the treatment of epilepsy in man are active in the foregoing tests. Further, most compounds active in these tests produce some generalised central nervous depression which is of benefit in their tranquilising properties, in addition to producing specific depression of certain centres in the central nervous system.

The compounds of the invention may be administered orally, by injection or otherwise, if desired together with one or more solid or liquid pharmaceutical diluents or carriers, as appropriate, and for convenience of administration they may be put up in a convenient dosage form, for example as tablets, capsules, powders or injection solutions.

The following examples are illustrative of the compounds of this invention and their production:

EXAMPLE 1

*Preparation of 2-(2'-hydroxyphenyl)-4:4-bis-hydroxymethyloxazoline*

Methylsalicylate (152 g., 1.0 mol.) and trishydroxymethylaminomethane (121 g., 0.1 mol.) were heated together, with stirring, in an oil bath at 180–190° C. for 1 hour. During this time 37 g. of methanol and water were distilled off and the mixture became homogeneous. Heating was continued for a further two hours under vacuum (0.5 mm. Hg), and the residue extracted repeatedly with boiling toluene. Concentration of these extracts, followed by cooling, gave the crude product. This was crystallised twice from aqueous ethanol and twice benzene, yielding the pure oxazoline product, M.P. 109–115° C. Its solubility in water is 0.2% w./w.

EXAMPLE 2

*Preparation of 2-(2'-hydroxyphenyl)-4:4-bis-hydroxymethyloxazoline hydrochloride*

2 - (2' - hydroxyphenyl) - 4:4 - bis - hydroxymethyloxazoline (10 g.) prepared as described in Example 1 was dissolved in the minimum amount of dry ethanol and a solution of hydrochloric acid gas in ether was added in excess. The precipitated gum solidified on scratching and was crystallised from a methanol-ether mixture to give the desired hydrochloride, M.P. 226–228° C. (d).

EXAMPLE 3

*Preparation of 2-(3'-chlorophenyl)-4:4-bis-hydroxymethyloxazoline, and of the corresponding 2'- and 4'-chlorophenyl compounds*

Meta-chlorobenzoic acid (15.5 g., 0.1 mol.) and trishydroxymethylaminomethane (12.1 g., 0.1 mol.) were treated together in tetralin (50 ml.) using a Dean and Stark water separating apparatus. The theoretical amount of water separated after 1 hour, whereafter the solution was cooled. The resulting solid was triturated with ether and filtered off. Crystallisation from benzene gave 2-(3'-chlorophenyl) - 4:4 - bis - hydroxymethyloxazoline, M.P. 113.5–115.5° C. Its solubility in water is 0.3% w./w.

The corresponding 2'- and 4'-chlorophenyl derivatives may be prepared in an analogous manner. The 2'-chlorophenyl compound has M.P. 138–139° C. and a water-solubility of 0.65% w./w. The melting point of the 4'-chlorophenyl compound is 181.5–182° C. and its solubility in water is <0.1% w./w.

EXAMPLE 4

*Preparation of 2-(3'-trifluoromethylphenyl)-4:4-bis-hydroxymethyloxazoline*

(a) PREPARATION OF METHYL 3-TRIFLUOROMETHYLBENZOATE

A solution of m-cyanobenzotrifluoride (100 g.) in dry methanol (300 ml.) was saturated with hydrogen chloride gas at room temperature, and refluxed with stirring overnight. Water (15 ml.) was added and the precipitated ammonium chloride filtered off. The mother liquors were evaporated to small bulk (150 ml.) and poured into water (400 ml.). The mixture was extracted with ether (3 x 100 ml. and the combined ether layers washed with water (twice) and dried with MgSO₄. The ether was distilled off under reduced pressure and the remaining oil fractionally distilled through a vacuum jacketed column (12 cm.) packed with helices to yield methyl 3-trifluoromethylbenzoate. B. Pt. 39–44° C./0.5 mm. Hg.

(b) 2-(3'-TRIFLUOROMETHYLPHENYL)-4:4-BIS-HYDROXYMETHYLOXAZOLINE

Methyl 3-trifluoromethylbenzoate (86 g.) and trisamine (60 g.) were heated with stirring at 180° C. for three hours during which distilled methyl alcohol and water (18 g., theory 20 g.) were collected. The remaining reaction mixture was then heated for 2 hours under vacuum (water pump). The reaction mixture was thereafter cooled and recrystallised (three times) from water to yield 2-(3'-trifluoromethylphenyl)-4:4-bis-hydroxymethyloxazoline, M.P. 114–116° C.

EXAMPLE 5

*Preparation of 2-(3',5'-dibromo-2'-hydroxyphenyl)-4:4-bis-hydroxymethyloxazoline*

Methyl 3:5-dibromosalicylate (47 g.; 0.15 mole) and trisamine (20 g.; 0.16 mole) were heated with stirring for three hours at 150° C. during which methanol and water were distilled off, whereafter heating was continued for a further two hours under reduced pressure (water pump). The residual mass was recrystallised from aqueous alcohol (twice) to yield 2-(3',5'-dibromo-2'-hydroxyphenyl)-4:4-bis-hydroxymethyloxazoline, M.P. 180–182° C.

EXAMPLE 6

*Preparation of 2-(3'-bromophenyl)-4:4-bis-hydroxymethyloxazoline*

Methyl m-bromobenzoate (65 g.; 0.3 mole) and trisamine (36.6 g.; 0.3 mole) were suspended in p-cymene (100 mls.) and refluxed for 8 hours in a Dean and Stark appratus, methanol and water being distilled over. The solution was then decanted hot and the solid which deposited on cooling was recrystallised from acetone and then from water, to give 2-(3'-bromophenyl)-4:4-bis-hydroxymethyloxazoline, M.P. 144–146° C.

EXAMPLE 7

*Preparation of 2-(3':5'-dichlorophenyl)-4:4-bis-hydroxymethyloxazoline*

Methyl 3:5-dichlorobenzoate (41 g.; 0.2 mole) and trisamine (24 g.; 0.2 mole) were heated with stirring at 170–180° C. for four hours, during which methanol and water (ca. 8 g.) distilled over, whereafter heating was continued under vacuum (water pump) for two hours. The residual oil was then poured into a small volume of cold ethanol, and the solid (obtained on scratching) was recrystallised twice from ethanol to yield 2-(3':5'-dichlorophenyl) - 4:4 - bis - hydroxymethyloxazoline, M.P. 174–176 C.

EXAMPLE 8

*Preparation of 2-(3':5'-dibromophenyl)-4:4-bis-hydroxymethyloxazoline*

Methyl 3:5-dibromobenzoate (18 g.; 0.061 mole) and trisamine (7.5 g.; 0.062 mole) were suspended in p-cymene (50 ml.) and refluxed in a Dean and Stark apparatus until the distillation of water and methanol had ended. The brown solid which separated on cooling was collected and washed with benzene. Recrystallisation (twice) from aqueous ethanol yielded 2-(3':5'-dibromophenyl) - 4:4 - bis - hydroxymethyloxazoline, M.P. 189–190° C.

EXAMPLE 9

*Preparation of 2-(3'-fluorophenyl)-4:4-bis-hydroxymethyl oxazoline* m-Fluorobenzoic acid (14 g.; 0.1 mole) and trisamine (12.1 g.; 0.1 mole) were suspended in xylene (150 ml.) and refluxed in a Dean and Stark apparatus until the theoretical amount of water had collected. The solid separating on cooling was collected and recrystallised (twice) from aqueous ethanol to yield 2-(3'-fluorophenyl)-4:4-bis-hydroxymethyloxazoline, M.P. 158–159° C.

We claim:

1. A member selected from the group consisting of 2-phenyl-4:4-bis-hydroxymethyloxazoline compound having at least one halogen substituent on the phenyl radical and nontoxic pharmacologically acceptable salts thereof.

2. 2 - (2' - chlorophenyl - 4:4-bis-hydroxymethyloxazoline.

3. 2 - (3' - chlorophenyl) - 4:4-bis-hydroxymethyloxazoline.

4. 2 - (4' - chlorophenyl) - 4:4-bis-hydroxymethyloxazoline.

5. A member selected from the group consisting of 2-(2'-hydroxyphenyl)-4:4-bis-hydroxymethyloxazoline and nontoxic pharmacologically acceptable salts thereof.

References Cited by the Examiner

UNITED STATES PATENTS

| | | | |
|---|---|---|---|
| 2,556,791 | 6/1951 | Billman et al. | 260—307.6 |
| 2,870,159 | 1/1959 | Bloom | 260—307 |
| 2,955,073 | 10/1960 | De Beer | 167—65 |
| 2,969,372 | 1/1961 | Braun et al. | 260—310 |
| 3,053,736 | 9/1962 | Abood et al. | 167—65 |
| 3,070,603 | 12/1962 | Belden | 260—307 |
| 3,128,295 | 4/1964 | Wehrmeister | 260—307.6 |

OTHER REFERENCES

Burger: Medicinal Chemistry, vol. 1 (New York, 1951), pages 44–45 and 47.

Burger: Medicinal Chemistry (New York, 1960), pages 75–77.

Pierce et al.: J. Am. Chem. Soc., vol. 73, pages 2596–2598 (1951).

Rosnati et al: Gazz. Chim. Ital., volume 90, pages 584-596 (1960).

NICHOLAS S. RIZZO, *Primary Examiner.*